No. 719,033. PATENTED JAN. 27, 1903.
A. E. NORRIS.
HOISTING APPARATUS.
APPLICATION FILED OCT. 27, 1900.
NO MODEL. 3 SHEETS—SHEET 1.

Witnesses.
Thomas J. Drummond.
Fred S. Greenhof.

Inventor.
Abner E. Norris,
by Crosby Gregory,
Attys.

No. 719,033. PATENTED JAN. 27, 1903.
A. E. NORRIS.
HOISTING APPARATUS.
APPLICATION FILED OCT. 27, 1900.
NO MODEL. 3 SHEETS—SHEET 3.

Witnesses.
Thomas J. Drummond
Fred S. Greenhof.

Inventor
Almon E. Norris,
by Crosby & Gregory
Attys.

United States Patent Office.

ALMON E. NORRIS, OF CAMBRIDGE, MASSACHUSETTS, ASSIGNOR TO RAWSON & MORRISON MANUFACTURING COMPANY, OF CAMBRIDGE, MASSACHUSETTS.

HOISTING APPARATUS.

SPECIFICATION forming part of Letters Patent No. 719,033, dated January 27, 1903.

Application filed October 27, 1900. Serial No. 34,532. (No model.)

*To all whom it may concern:*

Be it known that I, ALMON E. NORRIS, a citizen of the United States, and a resident of Cambridge, county of Middlesex, State of Massachusetts, have invented an Improvement in Hoisting Apparatus, of which the following description, in connection with the accompanying drawings, is a specification, like characters on the drawings representing like parts.

This invention relates to hoisting apparatus wherein is employed a main shaft supported in suitable bearings, said shaft having fixed thereon one member of a suitable friction clutch device and loosely mounted thereon winding-drums provided with friction clutch-surfaces coöperating with those of the friction clutch device, together with suitable operating mechanism, whereby the friction clutch-surfaces of the winding-drum and fixed clutch member may be engaged or disengaged; and the object of the invention is to improve generally the structure above described, whereby the life of the device may be materially lengthened.

The special features wherein the improvement lies will be hereinafter described, and particularly pointed out in the claims.

In the drawings, Figure 1 shows partially in section an apparatus embodying my improvements. Fig. 13 is a section on the line *z*, Fig. 1. Fig. 14 is a perspective view of a portion of one end of the drum, showing the inner side of the flange 8 and the ribs 8ª, hereinafter referred to.

Figures 1, 13, 14:
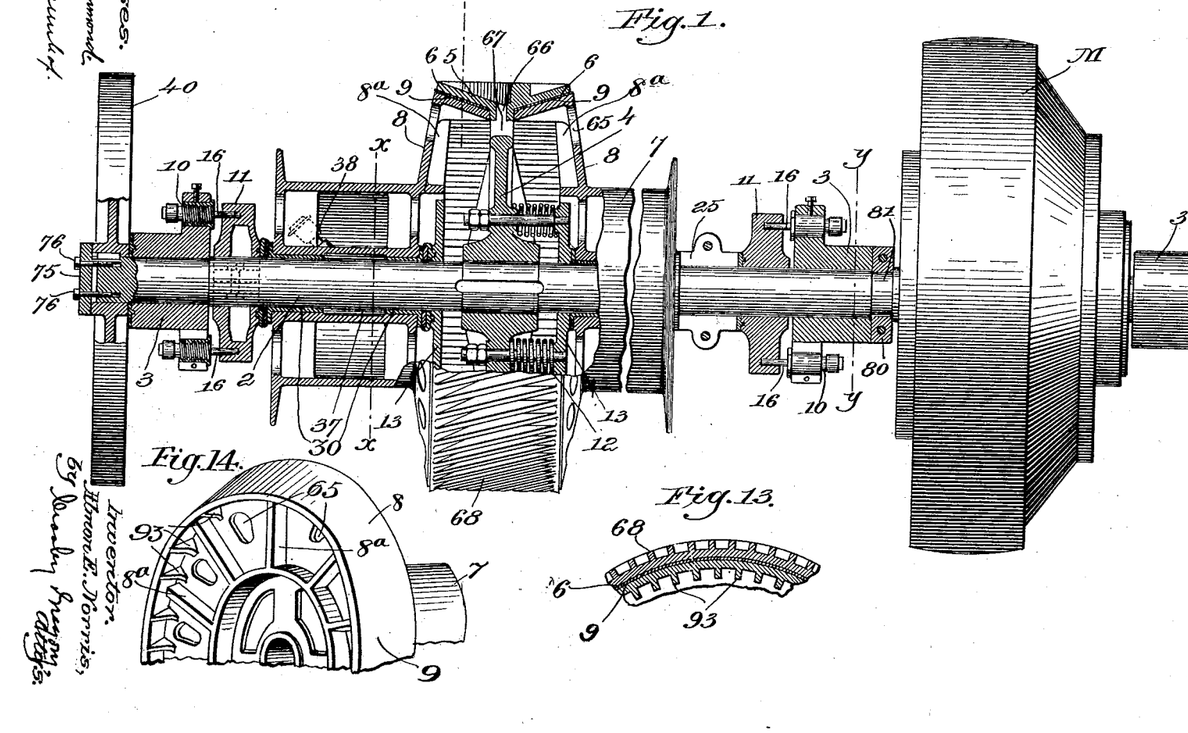

The apparatus shown in Fig. 1 comprises generally a main shaft 2, which is mounted for rotation in suitable bearings 3 and has fast thereon the fixed friction or clutch member 4, said friction or clutch member having the peripheral flange 5, provided with the oppositely-disposed friction clutch-surfaces 6. Loosely mounted upon the shaft 2 are the friction or winding drums 7, having at their inner ends the flanges 8, provided with the friction clutch-surfaces 9, which coöperate with the friction clutch-surfaces 6 on the fixed friction or clutch member. The mechanism for causing the engagement of the coöperating friction-surfaces comprises the twin operating screws 10, which are mounted in some suitable support in the nature of an abutment and which bear against the thrust-collar 11, interposed between the support or abutment and the friction or winding drum, whereby the rotation of the screws 10 operates to advance the thrust-collar, and thereby occasions the engagement of the friction-surfaces. The support or abutment in which the screws 10 are mounted may be constructed in any suitable way, its main and only essential feature being that it is a non-rotating support or abutment which is held from movement longitudinally of the shaft. In this embodiment of my invention I have chosen to use the bearings 3 for the shaft as the abutment or support for the operating-screws; but the invention would not be departed from if the screws were mounted in a support separated from the bearing, provided the support was a non-rotary one and was held from movement longitudinally of the shaft. Hence wherever I have used the term "abutment" in the following description and in the claims I intend to include any proper support for the operating-screws which is non-rotary and which is held from movement longitudinally of the shaft. For convenience I have used the numeral 3 as designating the abutment of whatever type employed. Suitable springs 12, bearing at one end against the fixed clutch member 4 and at the other end against the collar 13, serve to disengage the friction-surfaces when the operating-screws are backwardly rotated.

The mechanism thus far described is essentially the same as that shown and described in Patent No. 638,669, granted to me on December 5, 1899, and hence further description of the above parts is not necessary.

Figure 5:
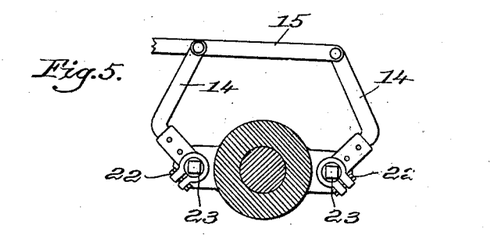
Fig. 5 is a section on the line *y y*, Fig. 1, looking to the left.
Figure 6:
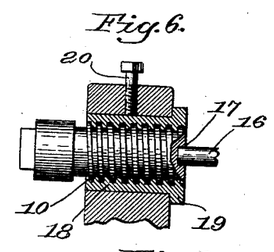
Figs. 6, 7, and 8 are details showing means for adjusting the clutch-operating screws for wear.
Figure 7:
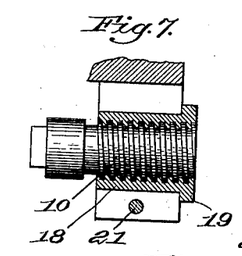
Figure 8:
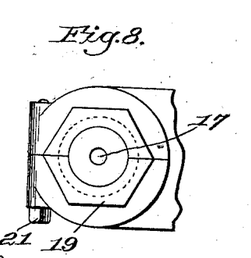

The operating-levers 14, which are connected to the operating-screws 10, by which said screws are turned, are connected together, so as to be rotated in unison by the link 15, as in the patent above referred to, and with this construction it will be seen that in turning the screws to cause the engagement of the friction-surfaces the arc of motion of the operating-lever is limited, so that when the said levers are operated the screw has a definite forward or backward movement. After considerable use the engaging parts between the operating-screws and the drum, which in this case constitutes the movable clutch member, become worn somewhat, so that the limited forward movement of the operating-screw fails to sufficiently engage the friction or clutch surfaces to cause the rotation of the drum. It thus becomes necessary to provide means for compensating for this wear, and in the patent above referred to this was accomplished by means of the adjusting-screws 10, which were mounted in the thrust-collar 7. In the present instance, however, the thrust-collar 11, which is concentric with the shaft but non-rotative, as in my former patent, has projecting from its outer face thrust-pins 16, made of any suitable material, (preferably steel,) the ends of the thrust-pins entering sockets 17 in the end of the operating-screws 10, as best shown in Fig. 6. The said thrust-pins 16 are, of course, non-adjustable, and in order to compensate for wear I make the screws 10 adjustable in the abutment 3, two ways of accomplishing this being shown in the drawings. As noted in Figs. 6 and 7, the screw 10 works in the bushing 18 of suitable material in the abutment 3, the said bushing being clamped in the abutment 3 by some suitable means and having the hexagonal flange 19, by means of which it can be turned in the abutment when the clamping means is loosened. It will be obvious that by turning the bushing 18 the screw 10 will be advanced sufficiently to take up the slack due to the wear between the thrust members, so that the limited forward movement of the clutch-operating screw will cause the friction-surfaces to become properly engaged. In Fig. 6 the means for clamping the bushing in its adjusted position is shown as a set-screw 20, which passes through the abutment and bears upon the bushing. In Fig. 7 I have shown a slightly-different form of a clamping means for the bushing, in this instance the bushing being supported in a split bearing, the two parts of which may be clamped together by the bolt 21 in an obvious way and when clamped together operate to securely hold the bushing in its proper adjusted position. It is obvious that the same effect can be produced by making the bushing fixed in the abutment and providing means whereby the operating-screws 10 may be turned or adjusted in the abutment, such construction being illustrated in Fig. 5, wherein the heads of the levers 14 are split, as shown, and clamped about the head of the clutch-operating screw 10 by means of the bolts 22 in a well-known way. The end of the operating-screw is squared, as at 23, and by loosening the bolts 22 the screws 10 may be turned in the bushing relative to the operating-levers 14, said adjustment of the screws relative to the levers operating to advance the same to thereby take up the slack due to the wear.

In all of the above constructions it will be seen that the adjustment is caused by providing means whereby the operating-screw may be adjusted in its bearings instead of making the adjustment by means of adjusting-screws, as in the former patent.

In Fig. 1 I have shown two ways of adjusting the bushing in its bearings.

Although I have above described the operating-screws as mounted in the fixed abutment, yet it is obvious they might be mounted in the non-rotating thrust-collar and bear against the abutment in both constructions, the effect of turning the screws being to advance the thrust-collar, and thus cause the friction-surfaces to become engaged.

As usual in this class of devices, the friction-surface on the winding-drum is provided with some suitable friction material, such as leather, and after continuous use this friction material becomes so worn as to require renewing, and by making the thrust-collars between the abutment and the winding-drum split collars it is obvious that such split collars may be readily removed from the shaft, thus allowing room to slip the drum on the shaft sufficiently longitudinally to expose the friction-surface 9. At the left hand in Fig. 1 is shown a construction wherein the thrust-collar 11 is split, as in my former patent. At the right in Fig. 1 a slightly-modified construction is shown wherein the thrust-collar 11 is solid, and an additional thrust member or collar 25 is interposed between the solid thrust-collar 11 and the drum 7, said thrust-collar 25 being split, whereby it may be readily removed from the shaft.

By the above construction it is not necessary to take the shaft from the bearings when it is desired to renew the friction-surface.

It is customary in this class of devices to provide wearing-washers between the engaging portions of the elements on the shaft, which are rotated at relatively different speeds; but heretofore the general practice has been to make such washers in one piece, in which case in order to renew the same the shaft was required to be removed from the bearings and the different elements on the shaft removed in order that the wearing-washers might be slipped over the end of said shaft. In my improved apparatus I make the wearing-washers split, whereby they may be easily placed on or removed from the shaft without removing the shaft from the bearings, and means are provided for interlocking the washer with the adjacent element on the shaft, said interlocking means serving to hold the two parts of the split washer in place. The core of the washers is slightly larger than the diameter of the shaft, and as the interlocking engagement of the washer and adjacent element on the shaft keeps the washer centered there will result an annular oil-chamber between the bore of the washer and the shaft, in connection with which I provide one or both faces of the washer with oil-grooves of such a shape that the rotation of the parts causes the oil which gathers in the oil-chamber to circulate through the grooves, thus lubricating the wearing-surfaces. In Fig. 1 I have illustrated a washer between the brake-disk 40 on the shaft and the abutment 3, between the thrust-collar 11 and the hoisting-drum, and, again, between the hoisting-drum and the collar 13.

Figure 11:
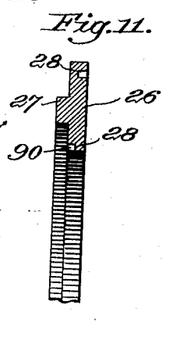
Figure 12:
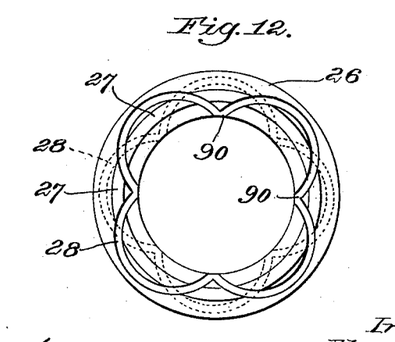

Figs. 11 and 12 show in enlarged detail one construction of wearing-washer embodying my invention, the washer being designated by 26 and having the interlocking means on one face in the form of the projection or annular rib 27, the said projection fitting into a corresponding recess in the abutting member, as shown in Fig. 1. Either or both faces of the wearing-washers are also provided with oil-grooves 28, which are of the form shown in Fig. 12, the said grooves coming to the inner periphery of the washer as a plurality of points, as 90, the portion of the groove between the points 90 passing nearly to the outer periphery of the washer. When the washers are in place on the shaft and properly centered by the interlocking means, an annular oil-chamber 91 is left between the washer and the shaft, since the washer is slightly larger in internal diameter than the shaft, and as the shaft and the elements of the hoisting mechanism thereon rotate the oil which collects in the oil-chamber 91 is carried by the friction of the parts through the grooves from one opening 90 to the next adjacent opening, thereby lubricating the parts, the circulating oil keeping the grooves clean and open. It will thus be seen that I have provided my washers with circulating oil-grooves.

As the winding-drum runs loose upon the shaft 2, I prefer to provide the bore of said drum with a suitable bushing 30, said bushing being preferably split in a well-known manner in order that it may be readily removed from the drum when it is desired to renew the same and without removing the drum from the bearings. As illustrated, the bushing has the flange 31, which engages the hub of the winding-drum 7, said flange having in its face an oil-groove 32 similar to the grooves 28 above described. With this construction the flange 31 of this bushing may perform the function of the wearing-washer 26, and, if desired, I may omit the said washer and employ only the bushing, as illustrated in the right-hand drum in Fig. 1. In removing the bushing when it is desired to renew the same a suitable sharpened implement is crowded between the flange of the bushing and the hub of the drum, when the said bushing can be easily forced out of the said drum. Suitable pins 92 are provided in the flange of said bushing, said pin entering suitable sockets in the hub of the drum and serving to lock the bushing to and insure its turning with the drum.

Figure 9:
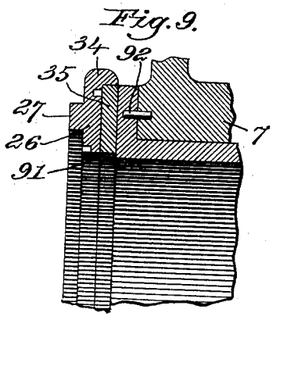
Figs. 9, 10, 11, and 12 are detail views showing the different forms of wearing-washers.
Figure 10:
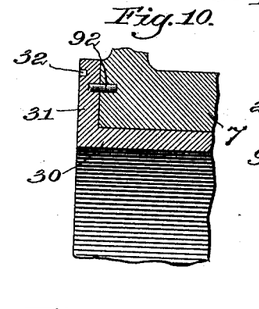

It is sometimes desirable to use both the flanged bushing and the washer, as illustrated in Fig. 9, in which case I provide the washer with an exterior flange 34, which operates to hold a separating-washer 35, the purpose of the washer being to prevent the wearing-surfaces of the washer and flange from engaging each other, for as the bushing and washers are preferably made of some suitable composition, such as bronze or Babbitt metal, it is undesirable that two surfaces of this metal should come in rubbing contact. The washer also provides additional friction-surfaces, which is desirable when the thrust is excessive. As illustrated in Fig. 9, the separating-washer 35, as well as the wearing-washer 26, has a slightly-larger bore than the bushing 30, whereby oil which may work its way along the shaft is retained in the space between the wearing-washer and the shaft, and thereby works into the grooves 28 and 32 to lubricate said surfaces, as specified above.

The central portion of the hub on the winding-drum is shown as provided with an enlarged oil-chamber 37, which may be filled with oil through the oil-cup 38 in a well-known manner, the said chamber 37 being of sufficient size so that when once filled with lubricant the apparatus needs comparatively little attention, so far as lubrication is concerned, for a considerable time.

As illustrated, the main shaft 2 is driven by means of any suitable electric motor M, mounted on the shaft at one end, and on the opposite end of the shaft is the brake-disk 40, which is controlled by the brake-band 41.

In the operation of the device the winding-drum 7 is clutched to the fixed clutch member 4 and the motor is started to rotate the winding-drum forward or in the direction to wind up the rope, and when it is desired to lower the rope or unwind the same the brake-band 41 is automatically set so as to lock the shaft against backward rotation, and the lowering of the rope is accomplished by loosening the friction-surfaces sufficiently so that they will slip under the influence of the weight attached to the rope.

Figures 2, 3, 4, 15:
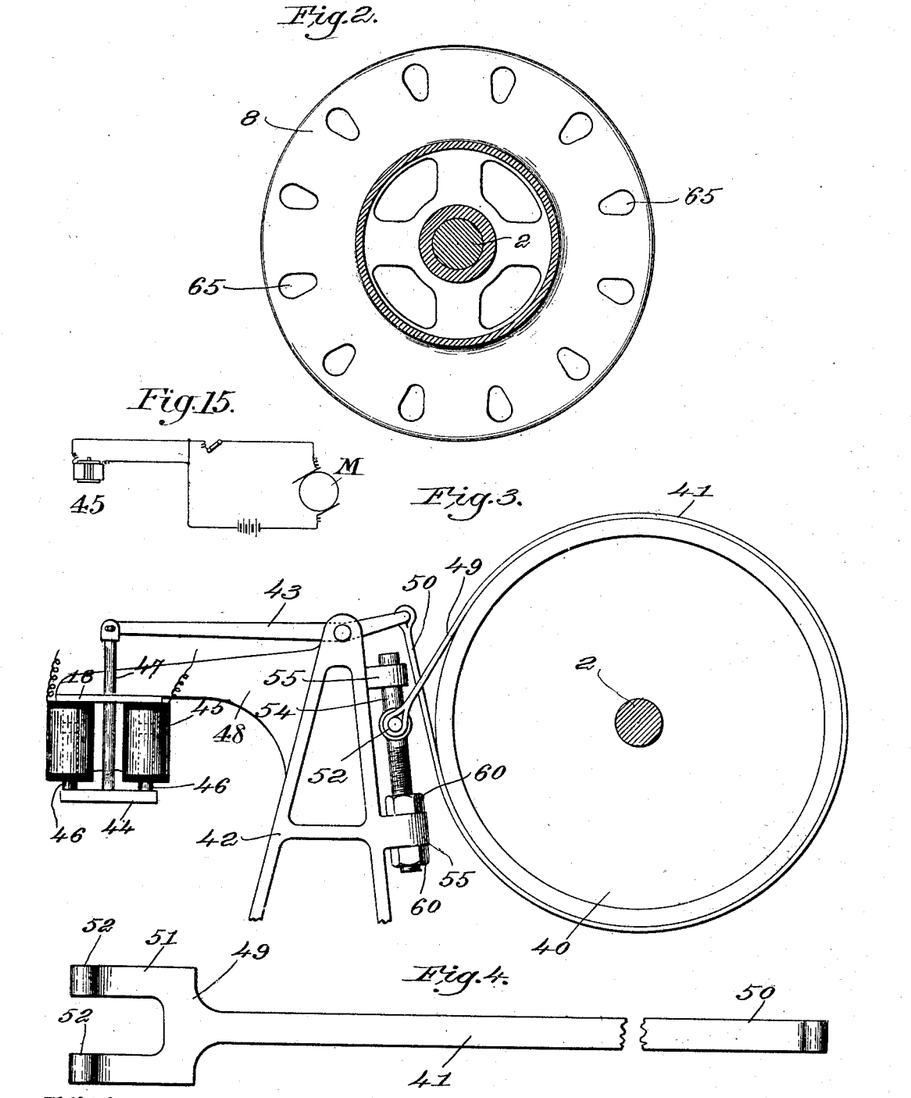
Fig. 2 is a section on the line *x x*, Fig. 1, looking toward the right.
Fig. 3 is a detail showing my improved brake.
Fig. 4 shows the brake-band.
Fig. 15 is a diagrammatical view showing the electrical connections between the motor and armature of the brake.

The brake-setting device is illustrated in Fig. 3, wherein 42 is a suitable stand upon which is pivoted a lever 43, the said lever being pivotally connected at one end to the brake-band 41 and supporting at its other end a suitable weight 44. The brake-setting device is controlled by a suitable electromagnet 45, fixedly supported in any suitable way, as by an arm 48, extending from the stand 42, the said magnet coöperating with the weight or armature 44, which has the projections 46 entering the magnet 45, thus increasing the efficiency thereof. The weight 44 is connected to a lever 43 by a brass rod 47, which passes up through the support for the magnets. The rheostat which controls the current to the motor M also controls the current to the magnet 45, so that when the current is on the motor a shunted current passes through the magnet 45, whereby the magnet is energized, and thereby lifts the weight 44 whenever the motor is running. It will be obvious that the lifting of the weight 44 operates to loosen the brake-band 41, thus allowing the brake-disk to rotate freely, while when the current is thrown off the motor the magnet 45 becomes deënergized, and the weight 44 consequently falls, and thus sets the brake and locks the main shaft 2 against backward rotation. Fig. 15 shows diagrammatically one way in which the magnet and motor may be electrically connected. The end 49 of the brake-band is fastened to some fixed support, the setting of the brake being done by taking up the free end 50 by means of the lever 43. As illustrated in Fig. 4, the extreme end 49 of the brake-band is branched, the two branches 51 being provided at their ends with loops 52, which engage arms on opposite sides of the adjusting-bolt 54, suitably mounted in a stand 42 by passing through the eyes 55. The free end of the brake-band passes between the branches 51 and is connected to the lever 43, the advantage of this construction being that the effective friction-surface between the band and the disk is almost the entire periphery of the said disk. The adjusting-bolt 54 is set at such an inclination to the straight portion of the band, where it engages the said adjusting-bolt, that as the bolt is adjusted by means of the nuts 60 the end 49 of the band is practically wrapped farther around the brake-disk, thereby increasing the effective surface between the band and the disk instead of merely drawing out the end of the band, as would be the case if the adjusting-bolt were in a line parallel to the straight portion 49 of the brake-band.

From the above it will be seen that I have provided a hoisting mechanism wherein the drum is driven by a friction clutch-surface, with an electric motor for operating the same and an automatic brake, whereby the brake is applied instantly when the current is turned off the motor and the brake is released whenever the motor is in operation, the friction clutch-surface being utilized in unwinding the drum to lower the load instead of running the motor backward, as is usual when a brake has heretofore been employed. During the lowering of the load the friction occasioned by slipping between the friction clutch-surfaces is apt to unduly heat the said surfaces, and thereby burn the friction material to such an extent as to destroy the same. My improvement comprises means whereby this objectionable heating of the friction-surfaces is largely avoided, and this is done by providing means whereby during the rotation of the winding-drum a current of air is established over the portions of the drum which carry the friction-surfaces, thereby assisting in radiating the heat, and to further augment such radiation each clutch member is provided with a series of heat-radiating ribs for increasing the radiating-surfaces. The flanges 8 of the winding-drums, which carry or furnish the support for the friction-surfaces, are each provided with a series of apertures 65, which are situated adjacent the friction-surface on the drum, as seen best in Fig. 2. With this construction the rotation of the drums establishes a current of air longitudinally through the drums and out through the apertures 65, this current of air obviously greatly assisting in carrying away any heat which may be generated by the friction-surfaces, and thus keeping the latter cool. In addition to the apertures 65 in the drum I may, if desired, provide apertures in the fixed clutch member, through which currents of air are also established, and, as herein illustrated, the peripheral flange 5 of the fixed clutch member has extending completely around its periphery a groove 66, and a series of apertures 67 connect the groove with the interior of the drums. When the apertures 67 are employed, the rotation of the drum establishes a current of air not only through the drum-apertures 65, but also through the apertures 67. In order to increase the current of air which is established by the rotation of the drum, I will preferably provide the radially-arranged flanges or ribs 8$^a$, which extend from the hub of the drum to the periphery thereof and are situated at substantially right angles to the flange 8. There will preferably be one of these ribs 8$^a$ between each two adjacent apertures 65, and they have such relation to the flange 8 as to form therewith compartments, in which the air is carried around by the rotation of the drum. The air which is thus confined between any two adjacent ribs or flanges 8$^a$ has a rotary movement as rapid as that of the drum, and the centrifugal action to which it is subjected operates to force the same out through the apertures 65, as will be obvious. While a drum constructed without these ribs 8$^a$ would by its rotation establish a current of air through the apertures 65, yet it will be obvious that by the employment of the ribs the volume of the air-current may be greatly increased. It will also be obvious that the effectiveness of the ribs may be increased by increasing their size—as, for instance, by extending them farther from the flange 8.

I have demonstrated by practical experiments that with the drums ventilated, as above described, any heat which may be generated by the friction-surfaces is dissipated by convection so rapidly that the friction-surfaces never get hot enough to injure the same. This I consider is one of the important features of my invention.

The outside of the peripheral flange 5 has a series of radiating-ribs 68 extending across the flange, the said ribs being preferably inclined, as shown in Fig. 1, such radiating-ribs increasing to a great extent the radiating-surface of the fixed clutch member and the inclined arrangement of said ribs operating somewhat as the blades of a fan to establish currents of air across the flange 5 and between the ribs 68, such currents of air dissipating the heat by convection.

As seen in Fig. 13, the interior of the flanges on the drum, which sustain the friction-surface 9, may also be provided with a series of heat-radiating ribs 93, said ribs further increasing the radiating-surface, the heat radiated from said ribs being carried away by the current of air out through the apertures 65 in the flange 8 of the drum.

It is sometimes desirable to adjust the shaft longitudinally in the bearings to compensate for wear, and this is provided for by means of a cap-plate 75 on the end of the shaft, said cap-plate bearing against the hub of the brake-disk 40, which is feathered on the shaft, said cap-plate being adjustable longitudinally of the shaft in any suitable way—as, for instance, by means of bolts 76. The opposite end of the shaft has the split collar 80, set in the groove 81 in the shaft, said collar bearing against the abutment 3. With this construction it will be obvious that by turning up the bolts 76 the shaft will be tightened in the bearings 3, to thereby prevent any longitudinal motion of said shaft.

It will be obvious that various changes may be made in my device without departing from the spirit of my invention.

Having described my invention, what I claim as new, and desire to secure by Letters Patent, is—

1. In an apparatus of the class described, a main shaft, a clutch member fixed thereon, a friction-drum loose thereon and constituting a movable clutch member, a non-rotary support held against movement longitudinally of the shaft, a non-rotating thrust-collar on said shaft, a screw mounted in one of said two last-named parts and operating to advance the collar, said screw being outside the periphery of the shaft, means to operate the screw, and means to adjust the said screw to compensate for wear, the rotation of said screw operating to force the collar longitudinally of the shaft, and thereby cause the engagement of the clutch members.

2. In an apparatus of the class described, a main shaft, a clutch member fixed thereon, a friction-drum loose thereon, a non-rotary support held against movement longitudinally of the shaft, a split thrust-collar on the shaft between the support and friction-drum, a screw mounted in the support and operating to give a longitudinal movement to said thrust-collar, said screw being outside the periphery of the shaft, and means to adjust the screw in the abutment to compensate for wear.

3. In a hoisting apparatus, a main shaft, a clutch member fixed thereon, a friction-drum loose thereon and constituting a movable clutch member, a fixed abutment, a thrust-collar on said shaft between the friction-drum and abutment, a screw in said abutment and outside of the periphery of the shaft, an operating-lever connected to the screw, the arc of movement of said lever being limited, and means to adjust the screw in the abutment to compensate for wear, the turning of the screw operating to give the thrust-collar the requisite longitudinal movement to cause the engagement of the clutch members.

4. In an apparatus of the class described, a main shaft, a friction member fixed thereon, a friction-drum loose thereon, a fixed abutment, a thrust-collar on the shaft between the abutment and friction-drum, a plurality of screws mounted in said abutment, and operating against the thrust-collar, operating-levers connected to the said screws, means to operate said levers in unison through a limited arc, and means to adjust said screws in the abutment to compensate for wear.

5. In a hoisting apparatus, a main shaft, a friction member fixed and a friction-drum loose on said shaft, a fixed abutment, a thrust-collar between the abutment and friction-drum, a thrust-pin in said thrust-collar, a screw in said abutment, one of said last-named parts having a socket at one end in which a projection on the other part rests, and means to adjust the screw in the abutment to compensate for wear.

6. In a hoisting apparatus, a main shaft, a friction member fixed and a friction-drum loose on said shaft, a fixed abutment, a split thrust-collar between the abutment and friction-drum, a plurality of screws in said abutment and outside of the periphery of the shaft, thrust devices between the screws and the collar, operating-levers for said screws, means to operate said levers in unison, and means to adjust said screws in the abutment to compensate for wear.

7. In an apparatus of the class described, a shaft, a clutch member fixed thereon, and having a friction-surface, a friction-drum loose on said shaft and having a coöperating friction-surface, means to cause the engagement or disengagement of said friction-surfaces, and means to establish a current of air over the parts on which said friction-surfaces are formed during the rotation of the drum.

8. In a hoisting apparatus, a shaft, a clutch member fixed thereon and having a friction-surface, a friction-drum loose on said shaft and having a coöperating friction-surface, one of said parts having a series of heat-radiating ribs adjacent the friction-surface, whereby the heat generated by said friction-surfaces is rapidly radiated, and means to cause the engagement or disengagement of said friction-surfaces.

9. In a hoisting apparatus, a shaft, a clutch member fixed thereon and having a friction-surface, a friction-drum loose on said shaft and having a coöperating friction-surface, one of said parts having a series of apertures or ducts therethrough adjacent to the friction-surface, and means to give a portion of the air within the drum a rotary motion with the drum, whereby, during the rotation of the drum the air is forced by centrifugal action through said apertures or ducts and dissipates by convection the heat generated by the friction-surfaces.

10. In a hoisting apparatus, a shaft, a clutch member fixed thereon and provided with a friction-surface, and a series of heat-radiating ribs adjacent said friction-surface, a drum loose thereon and provided with a coöperating friction-surface, said drum having a series of apertures adjacent to the friction-surfaces, and means to cause the engagement or disengagement of said friction-surfaces, the rotation of the drum establishing a current of air through the drum and out through the apertures whereby the heat generated by the friction-surfaces is dissipated by convection.

11. In a hoisting apparatus, a shaft, a clutch member fixed thereon and provided with a friction-surface, and a series of inclined heat-radiating ribs adjacent said surface, a drum loose on the shaft and having a coöperating friction-surface, said drum having a series of apertures adjacent its friction-surface, and means to cause the engagement or disengagement of said friction-surfaces, the rotation of said drum establishing a current of air through the drum and out the apertures, and the inclined ribs establishing currents of air across the fixed clutch member, whereby the heat generated by the friction-surfaces is dissipated by convection.

12. A shaft, a clutch member fixed thereon, and having a portion provided with a friction-surface, a friction-drum loose on said shaft and provided with a coöperating friction-surface and means to cause the engagement or disengagement of said friction-surfaces, said fixed clutch member having a series of inclined heat-radiating ribs adjacent the friction-surface.

13. In a hoisting apparatus, a shaft, a winding-drum loose thereon, a friction clutch device for driving said drum through the shaft, an electric motor connected to the shaft to forwardly rotate the same, a brake-surface fast on said shaft, a brake coöperating therewith, and automatic means for setting the brake and thereby locking the shaft against backward rotation when the motor is inactive, the friction clutch device providing means for controlling the backward rotation of the drum when it is desired to unwind the rope.

14. In a hoisting apparatus, a shaft, a winding-drum loose thereon, a friction clutch device for driving said drum from the shaft, an electric motor connected to the shaft to forwardly rotate the same, a brake-surface fast on said shaft, a brake coöperating therewith, an electromagnet for holding the brake inoperative while the motor is operative, and automatic devices for setting said brake when the motor is inoperative, the friction clutch device providing means for controlling the backward rotation of the drum in unwinding the rope.

15. In a hoisting apparatus, a shaft, means to drive the same, a winding-drum loose on the shaft, a brake-surface fast thereon, a brake-band coöperating with said brake-surface, automatic means for setting the brake and thereby locking the shaft against backward rotation when the driving means is inactive, and adjusting mechanism at one end of the brake-band, said adjusting mechanism operating to increase or diminish the effective surface of the band on the brake-surface.

16. In a hoisting apparatus, a shaft, means to rotate the same, a winding-drum loose on the shaft, a brake-surface fast on said shaft, a brake-band coöperating with said brake-surface, means for automatically setting the brake when the shaft-rotating means is inactive, and adjusting devices at one end of the brake-band, said adjusting devices operating to take up any slack in the band by wrapping the same further around the brake-surface.

17. In a hoisting apparatus, a shaft, means to drive the same, a winding-drum loose on the shaft, a brake-disk fast thereon, a brake-band surrounding said brake-disk, means for automatically setting the brake when the driving mechanism is inactive, an adjusting-bolt to which one end of said brake-band is attached, said adjusting-bolt being inclined to the direction of the band as it leaves the brake-disk.

18. In a hoisting apparatus, a shaft, means to rotate the same, a winding-drum loose on the shaft, a brake-disk fast thereon, a brake-band surrounding said brake-disk, an adjusting-bolt having lugs on opposite sides thereof to which one end of said brake-band is attached, said bolt being inclined to the direction of the band as it leaves the brake-surface whereby the effective surface of the brake-disk may be increased or diminished.

19. In a hoisting apparatus, a shaft, a clutch member fixed thereon, a friction-drum loose thereon, means to clutch the drum to the shaft, a split wearing-washer on said shaft between the clutch-operating means and the friction-drum, said split washer having circulating oil-grooves on one of its bearing-faces and means to detachably hold the parts of said washer in their operative position.

20. In a hoisting apparatus, a shaft having fixed thereon a clutch member and loose thereon a friction-drum, means to clutch the drum to the shaft, a split wearing-washer on said shaft between the clutch-operating mechanism and the friction-drum, said split washer and one of the members abutting the same having coöperating interlocking faces whereby said washer is held in place on the shaft.

21. In a hoisting apparatus, a shaft, a friction-drum loose thereon, means to clutch the drum to the shaft, a split wearing-washer on said shaft between the clutch-operating means and the friction-drum, said split washer and one of the members abutting the same having coöperating interlocking faces whereby said washer is held in place on the shaft, said washer being slightly larger than the shaft whereby an oil-chamber is left between the same and the shaft, and oil-grooves on one of the faces of the washer which open into said oil-chamber.

22. In a hoisting apparatus, a shaft, a friction-drum loose thereon, means to couple the drum to the shaft, and a wearing-washer on the shaft between the abutting members of the hoisting apparatus, said washer having on one of its faces, oil-grooves which cut the inner periphery of the washer and extend nearly to the outer periphery thereof.

23. In a hoisting apparatus, a shaft having a friction-drum loose thereon, means to couple the drum to the shaft, and split wearing-washers loosely mounted on the shaft between the abutting members of the hoisting apparatus, each of said wearing-washers having oil-grooves on its wearing-faces, and a projection on one of the faces which interlocks with the adjacent member.

24. In a hoisting apparatus, a shaft having a friction-drum loose thereon, means to couple the drum to the shaft, and split wearing-washers loosely mounted on the shaft between the abutting members of the hoisting apparatus, each of said wearing-washers having oil-grooves on its wearing-faces, and an annular projection on one of the faces which interlocks with the adjacent member.

25. In a hoisting apparatus, a shaft, a clutch member fixed thereto, a drum loose on said shaft and movable toward and from the clutch member, a split and separable bushing in the hub of said drum and turning on the shaft, said bushing having a flange provided on its outer face with oil-grooves.

26. In a hoisting apparatus, a shaft, a clutch member rigid therewith, a drum loose upon the shaft and movable toward and from the clutch member, a split and separable bushing in the hub of said drum, said bushing having a flange provided on its outer face with oil-grooves, and means to give the drum its longitudinal movement, said means including a thrust-collar bearing against the flange of the bushing.

27. In a hoisting apparatus, a shaft, a drum loose thereon, a clutch to drive the drum from the shaft, a split bushing in the hub of said drum and turning on the shaft, said bushing having a flange, and means to lock the flange of the bushing to the hub of the drum, said flange having circulating oil-grooves in its wearing-face.

28. In a device of the class described, a main shaft, a friction member fixed thereon, a friction-drum loose thereon, a fixed abutment, a split and separable thrust-collar on the shaft between the abutment and friction-drum, a plurality of screws mounted in said abutment and operating against the thrust-collar, operating-levers connected to the said screws, means to operate said levers in unison through a limited arc, and means to adjust said screws in the abutment to compensate for wear.

29. A shaft, a friction member fast thereon and provided with a friction-surface, a drum loose on the shaft, said drum having an apertured, annular flange carrying a friction-surface to coöperate with a friction-surface on the friction member, and means to give a portion of the air in the drum a rotary motion whereby the air is forced by centrifugal action out through the apertures in the flange.

30. In a device of the class described, a shaft, a friction member fast thereon and provided with a friction-surface, a drum loose on the shaft, said drum having an apertured, annular, radially-extending flange carrying a friction-surface to coöperate with that of the friction member, and means to cause the engagement or disengagement of the friction-surfaces.

31. In a device of the class described, a shaft, having a friction-surface rigid therewith, a drum loose on the shaft, said drum having an apertured, annular flange carrying a friction-surface to coöperate with the first-named friction-surface, and a plurality of substantially radially arranged ribs extending from the flange on the drum, and forming with the flange compartments in which the air is carried around the shaft by the rotation thereof.

32. In a device of the class described, a shaft having a friction-surface rigid therewith, a drum loose on the shaft, said drum having an apertured, annular flange carrying a friction-surface to coöperate with the first-named friction-surface, and ribs extending from the apertured flange and forming therewith compartments which serve to carry the air around the shaft.

33. In a device of the class described, a shaft, a friction member fast thereon and provided with a friction-surface, a drum loose on the shaft, said drum having an apertured, annular, radially-arranged flange carrying a friction-surface to coöperate with the friction-surface on the friction member, and a plurality of radially-arranged ribs extending from the annular flange.

34. In a hoisting apparatus, a shaft, a friction member fast thereon and provided with a friction-surface, a member loose upon the shaft and having an apertured annular flange carrying a friction-surface to coöperate with the first-named friction-surface, and means to cause the engagement or disengagement of said friction-surfaces, the rotation of the loose member operating to establish a current of air through said apertures.

35. In a hoisting apparatus, a shaft, a friction member fast thereon and provided with a friction-surface, a member loose upon the shaft and having a friction-surface to coöperate with the first-named friction-surface, means to cause the engagement or disengagement of said friction-surfaces, and means to give a portion of the air within the loose member a rotary motion about the shaft whereby the air is forced by centrifugal action over the parts on which said friction-surfaces are formed.

36. In a hoisting mechanism, a friction-drum, a friction driving device therefor, and means operative during the rotation of the drum to give the air within the drum a rotary motion whereby the centrifugal action of the rotating body of air establishes a current of air through the friction-surfaces of the friction driving device whereby the latter are prevented from heating.

In testimony whereof I have signed my name to this specification in the presence of two subscribing witnesses.

ALMON E. NORRIS.

Witnesses:
JOHN C. EDWARDS,
LOUIS C. SMITH.